United States Patent
Struthers et al.

(10) Patent No.: US 8,209,921 B2
(45) Date of Patent: *Jul. 3, 2012

(54) FLUSH MOUNT PANELS WITH MULTIPLE ALIGNED RECEIVING BRACKETS

(75) Inventors: Scott Struthers, San Clemente, CA (US); Ray Call, Mission Viejo, CA (US); Geoff Spencer, San Juan Capistrano, CA (US); Greg Fetter, Capistrano Beach, CA (US)

(73) Assignee: Dana Innovations, San Clemente, CA (US)

( * ) Notice: Subject to any disclaimer, the term of this patent is extended or adjusted under 35 U.S.C. 154(b) by 963 days.

This patent is subject to a terminal disclaimer.

(21) Appl. No.: 12/202,870

(22) Filed: Sep. 2, 2008

(65) Prior Publication Data

US 2009/0064629 A1    Mar. 12, 2009

Related U.S. Application Data

(63) Continuation-in-part of application No. 11/954,667, filed on Dec. 12, 2007, now Pat. No. 7,461,483, which is a continuation-in-part of application No. 11/566,365, filed on Dec. 4, 2006, now Pat. No. 7,699,138.

(60) Provisional application No. 60/950,237, filed on Jul. 17, 2007, provisional application No. 60/825,162, filed on Sep. 11, 2006.

(51) Int. Cl.
E06B 1/04 (2006.01)

(52) U.S. Cl. ........................ 52/204.1; 52/204.2

(58) Field of Classification Search .............. 52/204.1, 52/204.2, 213; 362/365
See application file for complete search history.

(56) References Cited

U.S. PATENT DOCUMENTS

| | | | |
|---|---|---|---|
| 5,056,287 A | 10/1991 | Weber | |
| 5,609,007 A | 3/1997 | Eichner | |
| 5,640,820 A * | 6/1997 | Wood | 52/514 |
| 6,217,189 B1 | 4/2001 | Nassim | |
| 6,431,723 B1 | 8/2002 | Schubert et al. | |
| 6,474,846 B1 * | 11/2002 | Kelmelis et al. | 362/365 |
| 6,997,574 B2 | 2/2006 | Kotovsky | |
| 7,028,440 B2 | 4/2006 | Brisson | |
| 7,108,394 B1 | 9/2006 | Swarens | |
| 7,732,715 B2 * | 6/2010 | Paolucci | 174/481 |
| 2007/0051862 A1 | 3/2007 | Monti | |
| 2007/0209305 A1 | 9/2007 | Douglas | |

FOREIGN PATENT DOCUMENTS

WO     2008-027234     6/2008

OTHER PUBLICATIONS

Portafab, Modular Building Systems, Quick Ship Prefabricated Offices, http://www.portafab.com/industrial_quick_ship.shtml.

* cited by examiner

*Primary Examiner* — Basil Katcheves
(74) *Attorney, Agent, or Firm* — Fish & Associates, PC

(57) ABSTRACT

A panel with multiple openings and brackets can be used to flush-mount multiple components in a wallboard. The panel is installed flush with the wallboard and the junction between the panel and the wallboard is plastered or drywalled to create a uniform appearance. Wall-mounted components can then be installed into the brackets into openings that have been pre-measured and cut to ensure that the components are aligned with precision relative to one another before installation even begins.

13 Claims, 11 Drawing Sheets

FLUSH MOUNT PANELS WITH MULTIPLE ALIGNED RECEIVING BRACKETS

This application is a continuation-in-part of non-provisional application Ser. No. 11/954,667 filed Dec. 12, 2007 now U.S. Pat. No. 7,461,483. Ser. No. 11/954,667 is a continuation-in-part of non-provisional application Ser. No. 11/566,365 filed Dec. 4, 2006 now U.S. Pat. No. 7,699,138, and also claims priority to (1) provisional application Ser. No. 60/950,237 filed Jul. 17, 2007 and (2) International application ser. no. PCT/US07/16404 filed Jul. 19, 2007. Ser. No. 11/566,365 claims priority to provisional application Ser. No. 60/825,162 filed Sep. 11, 2006. PCT/US07/16404 claims priority to (1) non-provisional application Ser. No. 11/548,381 filed Oct. 11, 2006, (2) provisional application 60/825,162 filed Sep. 11, 2006, and (3) provisional application 60/950,237 filed Jul. 17, 2007. All prior applications are incorporated by reference in their entirety.

FIELD OF THE INVENTION

The field of the invention is wall and ceiling receptacles.

BACKGROUND

Plasma screens, speakers, light switches, electrical outlets, recessed lighting, junction boxes and other components are conventionally mounted by cutting a hole in a wall or ceiling, inserting a bracket, and then installing a component into the bracket. When several components are mounted on the same wall or ceiling, installers typically attempt to line up the components or space out the components in an aesthetic pattern. Under those circumstances, being able to mount multiple components in a wall or a ceiling in precise locations relative to one another can become very important to achieve a clean and exacting appearance. However, since the cutouts are performed at the job site, it can be difficult to line up or evenly space multiple components. Even where the task can be performed, there is a considerable amount of work exerted in taking measurements and making minor adjustments.

One method of lining up mounted components is to attach them along a length of a beam, joist or other substantially straight support structure. U.S. Pat. No. 5,056,287 to Weber teaches a ceiling light system attached directly a ceiling joist along a straight line. U.S. Pat. No. 5,609,007 to Eichner teaches attaching components to a grid in a ceiling. Weber, however, is ineffective at attaching components in positions other than along a ceiling joist, and Eichner cannot be used for recessed components integrated with the existing wall or ceiling. These and all other extrinsic materials identified herein are incorporated by reference in their entirety. Where a definition or use of a term in an incorporated reference is inconsistent or contrary to the definition of that term provided herein, the definition of that term provided herein applies and the definition of that term in the reference does not apply.

Lining up components of different sizes along a beam or a grid can also prevent an installer from aligning the components along different axes. In FIG. 1, for example, three components of differing sizes 20, 30, and 40 are attached to a side of ceiling joist 10. Attaching the components directly to the support beam means that the centerlines of the components are out of alignment with one another. U.S. Pat. No. 6,431,723 to Schubert teaches a method of aligning the centerline of components by adding additional support beams between existing ceiling joists. However, adding additional support beams for each mounted component is time consuming, labor intensive, and is still prone to errors if the installer makes a measurement mistake.

Another method of mounting components is to prefabricate an entire wall with framed cutouts located where the components are to be installed. US 2007/209,305 to Douglas teaches building pre-fabricated housing with pre-cut windows and pass-throughs. However, building an entire wall in advance at an off-site location is very often impractical, especially when making a late installation decision after a wall has been installed. Additionally, none of the prior art teaches arranging mounted components that achieve a flush-mount appearance in walls, ceilings, and other structures, in which little or even no finishing is required around the periphery of the opening.

Thus, there is still a need for methods of mounting multiple components in a substantially flat structure of a building at precise locations relative to one another.

SUMMARY OF THE INVENTION

The present invention provides apparatus and methods in which multiple components are mounted into a wall, ceiling, or other wallboard using a panel with brackets to hold the components. Typically, a wallboard is a building board made for surfacing rather than for insulating ceilings and walls. Wallboards are often made into large rigid sheets that are fastened to the frame of a building to provide a surface finish. As used herein, the term "wallboard" should be construed broadly to mean any sort of mechanical barrier for surfacing ceilings or walls. Wallboards can be made of any suitable material, including for example plywood, plaster, wood, wood pulp, or gypsum.

Preferred panels have compositions and thicknesses that match the wallboard to which they are being finished, in terms of thickness, composition, and so forth. Where there are differences in composition or thickness, it is preferred that the moisture absorption rate and the thermal expansion rate of the panel and the wallboard differ by no more than 30%, 20%, 10% or 5% from one another to prevent cracking and fraying. Contemplated panel materials include polymers, plasters, woods, fiberboards, and gypsum. Since the panel will likely be anchored to a support structure using a screw, nail, or similar attachment mechanism, preferred panels have a plurality of screw hole positions, for example depressions, markings, or screw holes, that indicate potential screw or nail positions. Panels can have factory cut openings that receive the multiple receivers, and in such cases the receivers would likely be glued to the panel material to eliminate any gaps. More advantageously, the panel material can be molded around the receivers so that there is essentially no gap between panel material and receivers.

Two, three, or more receivers can be affixed to openings in the panel, which typically extend from a front side of the panel to the back side of the panel. Receivers can range from a simple rim disposed on the inside of the opening to an extensive bracket and housing extending out the back of the panel. In any event, completed assemblies preferably have little or no discernable gap between the panel and the receiver. This can be accomplished in any suitable manner, including for example, accurately cutting the opening into which the receiver is installed and then gluing the receiver to the panel. Where the panel comprises a formed substance such as drywall, another option is to form the panel around the receiver.

The receivers can be arranged within the panel in any suitable manner, for example aligning the top or bottom edges of the receivers to be parallel or co-linear to one another, or by centering all the receivers along an axis running along the length of the panel. In preferred embodiments, each receiver has a spackle shield that covers the opening, which can include useful installation tools, for example a level, installation screws, or installation instructions. In the figures, each of the receivers also has an optional spackle rim that extends outwardly from the front surface of the panel by a small distance. Preferred distances are less than ½ inch (1.27 cm), more preferably by only ⅛ inch (3.175 mm), and even more preferably ¹⁄₁₆ inch (1.5875 mm). Spackling compounds can then be smoothed over the surface of the wallboard and panel up to the spackle rims to achieve a contiguous visual appearance.

Panels are typically installed into the wallboard by first approximating the edges of the panel with the edges of the wallboard. "Approximating" is defined herein to mean bringing the edges near or towards one another so that the junction or gap between the edges is less than 10 mm (0.394 in), 5 mm (0.197 in), or even 2 mm (0.079 in). If the junction or gap between the edges is larger, a buffer can be attached to the edge of the panel before installation, or one or more shims can be installed into the junction. The junction can then be concealed using a suitable construction method, for example taping or plastering over the junction. Providing a pre-fabricated panel designed to accept specific components greatly facilitates installation by eliminating the need for on-site precision measurements.

All types of components are contemplated for installation, but especially including components having electrical parts. For example, speakers, lights, switches, wall plugs, wall controls (audio, video, fan), thermostats, fire sprinklers, fire alarms and smoke alarms, mirrors, kitchen appliances, intercoms, air vents, vacuum outlets, security panels, and iPod docks and ports are all contemplated components.

The components are preferably seated to the receivers in a removable manner, for example detents, latches, biasing mechanisms, locks, or magnets. Special removal tools are contemplated for releasing and withdrawing the component. For example a latch can be attached to a ferrous metal or magnet so that a magnetic tool unlocks the latch from the component, allowing it to be removed from the receiver.

Various objects, features, aspects and advantages of the present invention will become more apparent from the following detailed description of preferred embodiments of the invention, along with the accompanying drawings in which like numerals represent like components.

DETAILED DESCRIPTION

Figure 1:
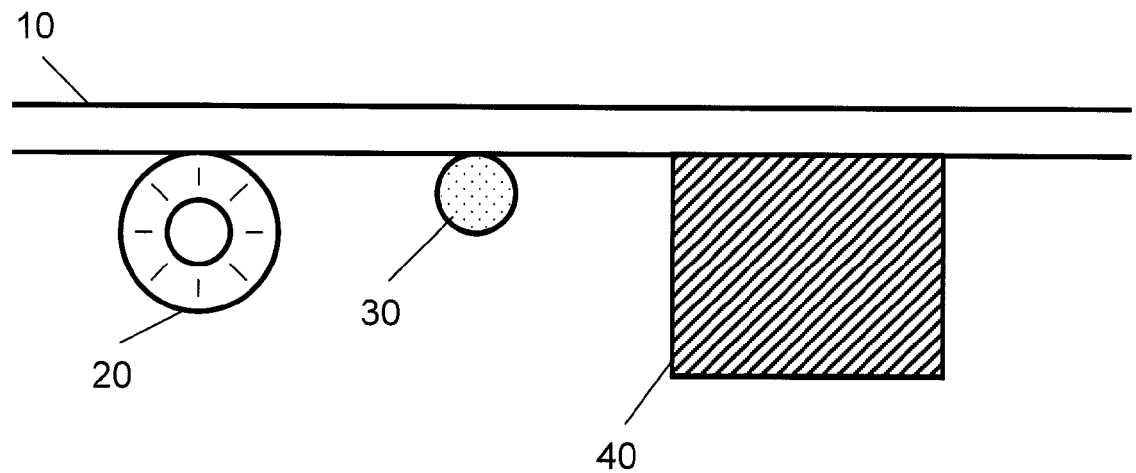
FIG. 1 is a plan view of prior art components mounted to a ceiling joist.
Figure 2:
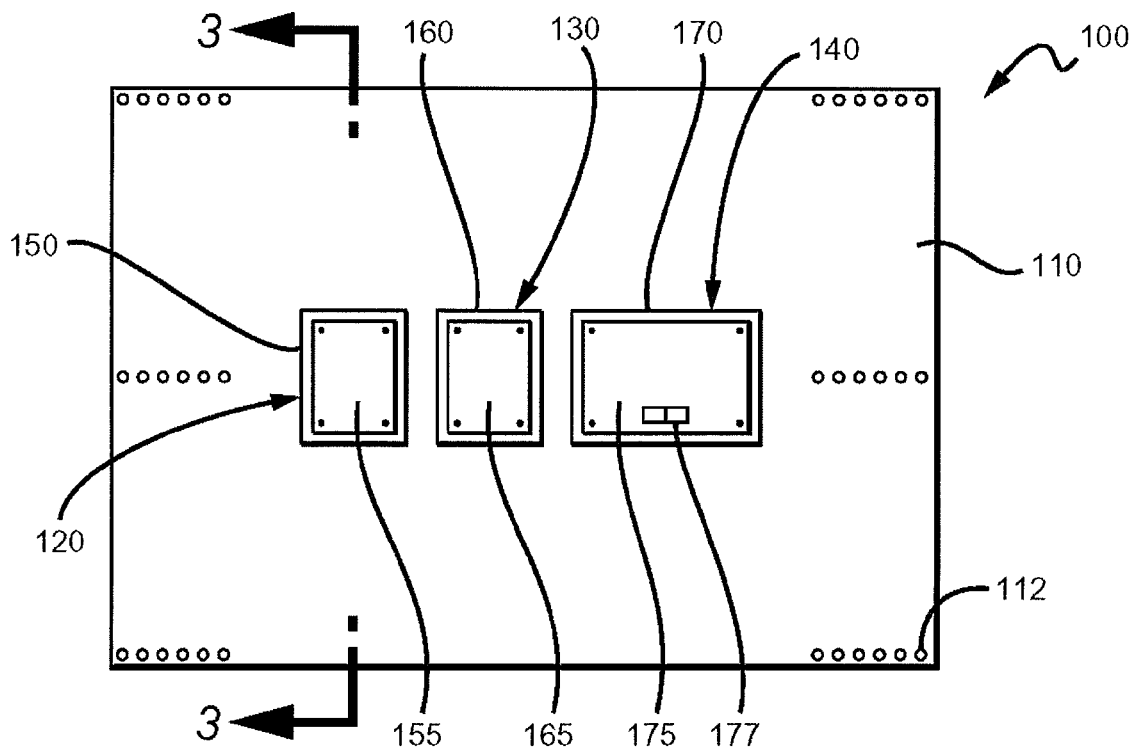
FIG. 2 is a plan view of a panel having three openings, with a bracket disposed within each opening.

In FIG. 2 a component mounting apparatus 100 generally includes a panel 110 with openings 120, 130, and 140. Each opening 120, 130, and 140, has a bracket 150, 160, and 170, and a spackle shield 155, 165, and 175, respectively. It should be appreciated that while each bracket is sized and dimensioned to hold a specific component, the brackets could be identical to one another to create a "universal bracketing system" that can hold components of various sizes.

Panel 110 is a piece of gypsum board, wood, plastic, or other material (or combination of materials) sufficiently strong to support a speaker or other desired component between two studs of a wall, or joists or other supports in a ceiling. Where plywood is used as the panel material, for example, the panel might be as thin as ¼" (6.35 mm), but would more preferably measure at least ½" (12.7 mm) or ⅜" (19.05 mm). Preferred materials include wallboard, Medium Density Fiberboard (MDF), High Density Fiberboard (MDF), Acrylonitrile Butadiene Styrene (ABS), and other materials that closely match various characteristics of drywall. Multiple materials could be used, for example mixed in with one another, alternating, layered on top of one another, or a combination. Preferably, the material has equal moisture absorption and coefficient of thermal expansion as the surrounding wallboard, while having greater durability and strength for attaching heavy components directly to the panel. For example QuietRock® 525 could be a paneling material used where the wallboard comprises drywall.

Panel 110 is generally about twenty inches (about 50 cm) to twenty-four inches (about 60 cm) wide, but panel 110 can have any other suitable dimensions, even for example, up to the size to replace an entire sheet of wallboard. Narrower panels are also contemplated, although they would likely not have a sufficient width to extend between wall studs or ceiling joists. It is preferable for the panel 110 to have a width of at least six inches (15.24 cm) or twelve inches (30.48 cm) greater than the spacing between studs, which allows the installer considerably greater flexibility in positioning the panel on the wall. Lateral wings (not shown) could be attached to the perimeter of panel 110 to extend the width for installations where the studs are spread apart at a greater distance from each other than normal. While panel 110 is shown as a substantially planar apparatus, panel 110 can be concave, convex, or any other shape to either match the shape of the wallboard, or to introduce a non-planar surface to the wallboard.

Receivers 112 are hole primers that are spaced approximately 1 inch (2.5 cm) from center, a diameter of 0.375 in (9.525 mm), and are approximately ¼ in (6.35 mm) deep, but can be shaped and configured in other suitable ways. A "hole primer" is a concave hole deepest in the center that helps an installer drill a screw or hammer a nail in a designated place without slipping. The diameter of the hole primer is preferably larger than the diameter of the screw head or nail head used so as to prevent the head of the screw or nail from leaving an unsightly bump on the surface of the wallboard after spackling. Other suitable receivers are contemplated, for example visual marks or pre-drilled and threaded screw holes.

Each opening 120, 130, and 140 can also be of any suitable shape and size. Preferred openings are rectangular to accommodate common rectangular components, for example light switches, wall outlets, speaker volume controls, and home security systems. However, the openings could also be oval or circular or any other desired shape. The area of the opening is generally dependent on the size of the component, and can range up to 80 in$^2$ or larger. Especially preferred openings have an area of at least 20 in$^2$, 40 in$^2$, 60 in$^2$, and even 80 in$^2$. Nevertheless, for stability, it is contemplated that the panel have openings with a length that is no more than half or one third the length of the panel.

The openings 120, 130, and 140 are shown to be identical in height, and are aligned with one another in a row, but it should be appreciated that the openings do not have to have any shared dimensions, and could be positioned in any suitable arrangement relative to the panel 110. Openings with varying height could be aligned along their top or bottom edges, aligned along a centerline, or could be arranged in a staircase fashion with a top edge aligned to a bottom edge. Openings could be cut at a job site or elsewhere by an installer, but are more conveniently precut (or molded to include the opening) at the manufacturer. It is possible for a panel to have punch out openings or perhaps cutout lines to facilitate selection of the position of the opening at the job site, but those options are currently disfavored relative to a manufactured pre-cut or molded opening and a relatively large panel.

Figure 3:
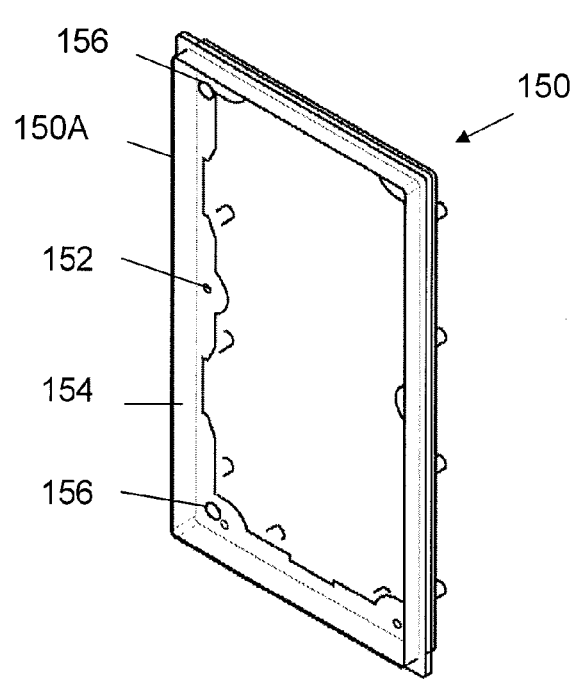
FIG. 3 is a front perspective view of one of the brackets in FIG. 2.

Brackets 150, 160, and 170 are preferably sized and dimensioned to fit snugly into the openings 120, 130, and 140, but in any event are screwed, glued, clamped, or are otherwise securely attached to the panel 110. The secure attachment is important since in at least some embodiments, the component housing will be attached to the bracket rather than being directly attached to the panel 110. The brackets are preferably molded from polyethylene or other sufficiently strong and durable thermoset plastic, and as shown in greater detail in FIG. 3 bracket 150 includes holes 152 for screws (not shown), a recess 154 into which a component cover 18 can be removably secured via a holding mechanism, and a rim 150A, and optional magnets 156 or an optional press fit (not shown).

Spackle shields 155, 165, and 175 preferably cover the opening of the brackets to prevent mud or drywall from splashing to the other side of the panel, and can be removed after spackling. This is particularly helpful for when an electronic component is pre-installed behind the panel before spackling. Spackle shield 175 can have optional level 177 to help ensure that the panel is being installed horizontally. While level 177 is shown as a standard spirit level, any device that ensures that the panel is level is appropriate. Other devices that assist in installation can be provided in the spackle shield, for example a laser leveler to help align several panels with one another or a compartment that stores extra screws and magnets.

The components mounted to brackets 150, 160, and 170 can be any components mounted to a wall, for example speakers, plasma screens, in wall art panels, in wall cabinets, windows, wall outlets, security systems, fuse boxes, light switches, lighting, sprinkler systems, smoke detectors, and so forth. While the brackets and openings are generally shaped and sized to fit particular electronic devices, for example a rectangle for a light switch or a circle for a ceiling light, the universal brackets may be used that can accommodate a variety of electronic devices. To fit the component to a universal bracket, the component could consist of an outer casing that fits around the electronic device and couples to the universal bracket.

Figure 4:
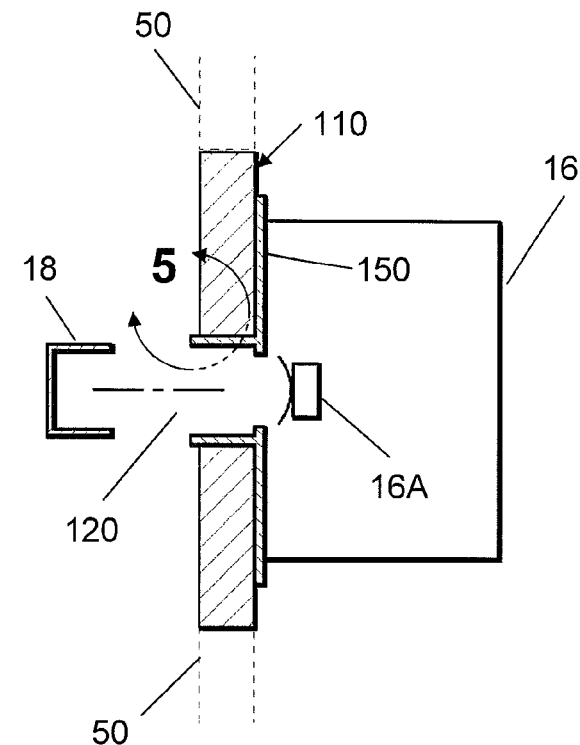
FIG. 4 is a simplified vertical cross-section of the panel and one of the brackets of FIG. 2, taken along line 4-4, installed in a wall and with an attached component.

FIG. 4 also shows a component 16 and a component cover 18. Component 16 is shown having speaker 16A, but component 16 could be any practical component, including especially speakers, lights, air conditioners, or any other component that is typically larger than its external opening. The various wires for power and signal are not show in the Figures, but could be assumed, and can be those conventionally contemplated in the art. Component cover 18 can be any suitable grille, but is preferably a metallic mesh grille that press-fits into the opening 120. Additionally or alternatively, the component cover can include a ferrous material that is attracted to magnets 156 in bracket 150.

Figure 5:
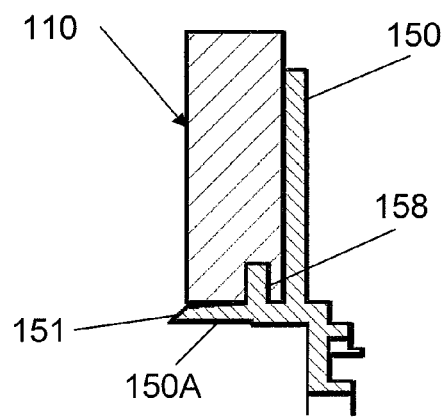
FIG. 5 is a blown up view of the circled portion of FIG. 4.

As seen in FIG. 5 the rim 150A is sized and dimensioned to extend outwardly beyond a front of the panel 110 by a very small distance 151, which provides a lip that can readily be used as a stop against which to spread a spackling compound, for example plaster or drywall. Preferred such distances 151 are less than ⅛ inch, and preferably about 1/16 inch, or in metric terms about 1-3 mm. Preferably, the panel has a thickness of at least ¼ inch (6.35 mm). Also shown in FIG. 5 is an attachment member 158 that helps secure bracket 150 to panel 110. A screw hole (not shown) can be provided in attachment member 158 to help affix bracket 150 to panel 110.

It should be appreciated that the rim could be separable from the panel. Thus, for example, the rim could be a separately molded piece of plastic, metal or composite that is installed into the opening by the installer, or at a factory.

Figure 6A:
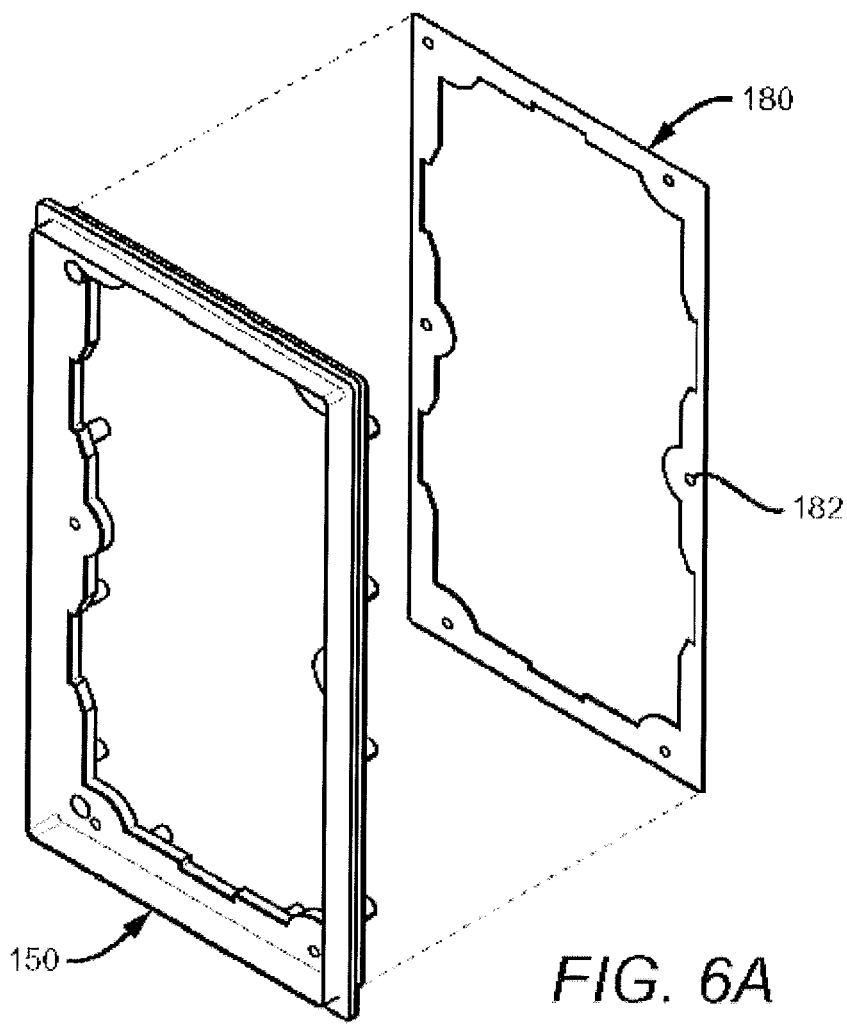
FIG. 6A is a front perspective view of the bracket of FIG. 3 positioned to couple with a bracket backing.
Figure 6B:
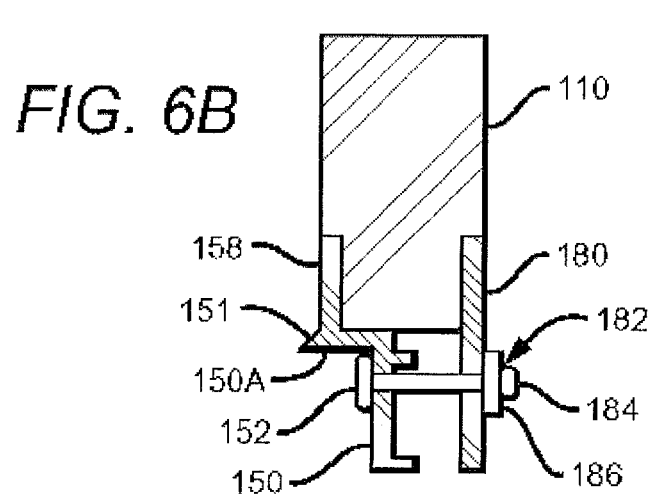
FIG. 6B is a simplified vertical cross-section of the panel of FIG. 2, taken along line 4-4, with the bracket and bracket backing of FIG. 6A.

As seen in FIGS. 6A and 6B, a bracket backing 180 with screw holes 182 could be used to clamp bracket 150 to panel 110. In this embodiment, attachment member 158 fits within recess 114 on the front of panel 110 and bracket backing 180 fits within recess 116 on the back of panel 110. Screw 184 threads through screw holes 152 and 182, and finally through nut 186 to provide a clamping force around panel 110. Clamping bracket 150 to panel 110 provides a secure connection without the need for expensive glues or adhesives.

Figure 7A:
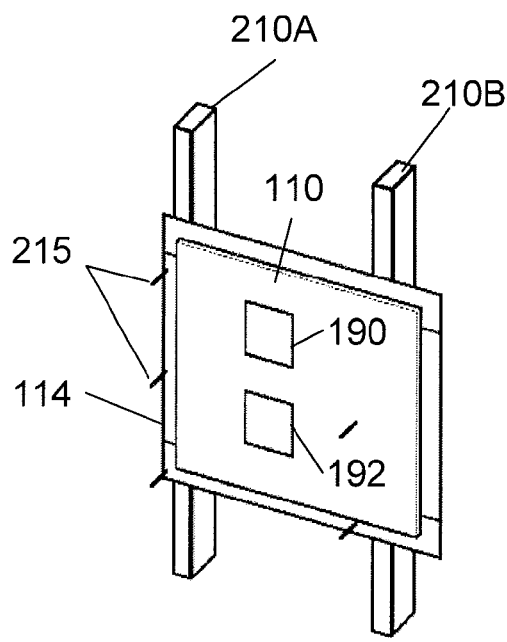
FIG. 7A is a front perspective view of a panel being affixed to two studs in a wall, the panel having a spackle shield covering the openings.

In FIG. 7A, the panel 110 is affixed to two studs 210A, 210B in a wall, and screws 215 are inserted through hole primers 112 and the panel 110 on the right side, and through an attached flange 114. Panel 110 shows openings 190 and 192 with the spackle shields covering the brackets. Of course, the positioning and orientation of the panel could be varied in any suitable manner with respect to the studs, 210A, 210B, including moving the panel 110 higher or lower, left or right, or even tilting the panel clockwise or counterclockwise. Similarly, the studs should also be interpreted herein as emblematic of any support structures of a wall, whether or not such structures are technically considered to be studs. In addition, a greater or lesser number of screws could be used, or inserted in some other arrangement than that shown to provide greater or lesser support. The screws could also be replaced or supplemented by some other attachment means such as an adhesive.

Those skilled in the art will appreciate that the combination of panel and bracket could be provided in several different ways. The panel and bracket could, for example, be joined together at a job site, and indeed the panel could even be "manufactured" at the job site by cutting or punching out the opening. More preferably, however, the panel and bracket are provided as an item of manufacture to the installer by a supplier or manufacturer. The rim of the panel can be pre-installed to the panel. Thus, in various embodiments a kit could contain one or more of a panel, a bracket (or at least a rim around the edges of an opening in the panel), a speaker housing, a spackle shield, and installation screws. The installer would then provide whatever labor is appropriate for the installation, including optionally installing the bracket and/or rim, optionally installing the spackle shield, and optionally mounting the speaker into the speaker housing to the back side of the panel. It is also contemplated that the speaker can be pre-installed into the panel before installation. Alternatively the combination of the panel and bracket can be mounted before installing a rim on the opening.

Figure 7B:
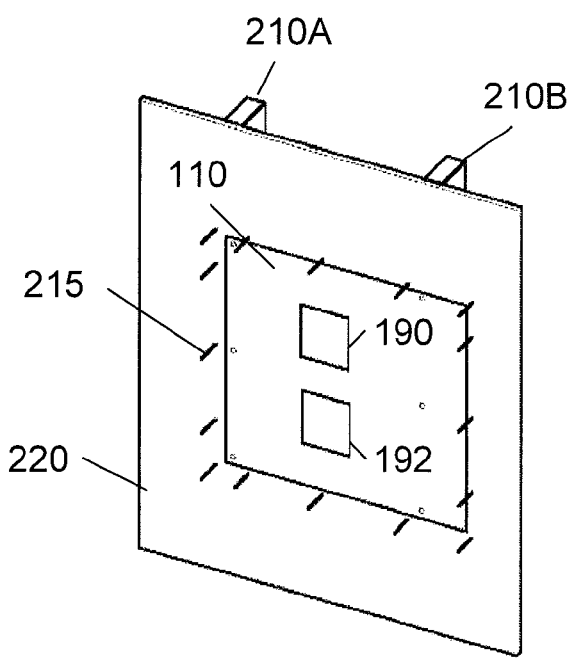
FIG. 7B is a front perspective view of the panel of FIG. 7A, around which drywall has been installed.

In FIG. 7B drywall 220 or other wallboard has been installed on all four sides around the panel 110, and coupled to the wings using screws 215. Where wings are present, as in the embodiment depicted, the drywall 220 overlays the wings, but the wings are sufficiently thin so that the drywall is not noticeable raised. Those skilled in the art will appreciate that although FIG. 7B shows the drywall 220 surrounding the panel 110 as a single piece, it is entirely possible that the drywall could comprise multiple pieces (not shown). It is also contemplated that installation of the drywall 220 might be delegated to drywaller or other tradesman distinct from the panel installer. Nevertheless, the process of installing the panel on one or more wall supports is deemed to include the step of positioning the panel so that it can be approximated in an end-to-end fashion by a piece of wallboard or other wall section.

Figure 7C:
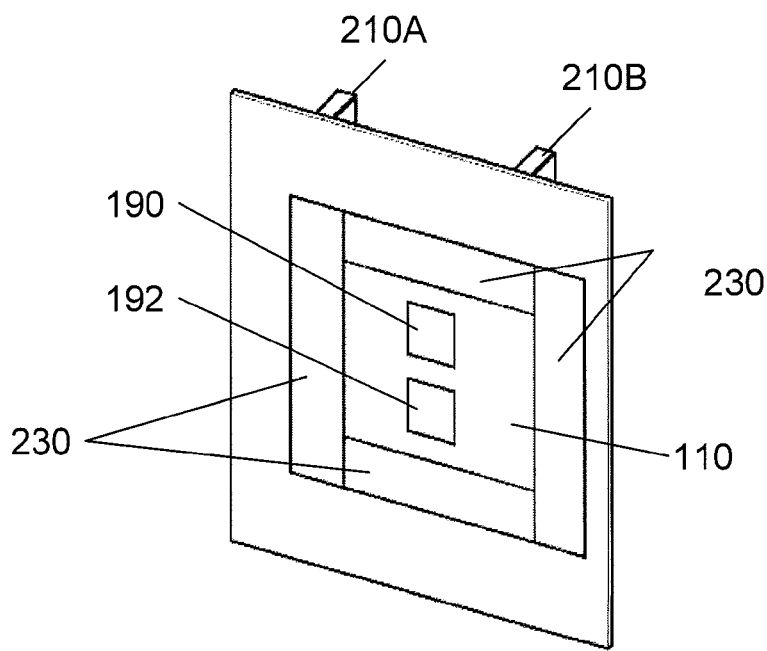
FIG. 7C is a front perspective view of the panel and drywall of FIG. 7B, showing mesh tape.

In FIG. 7C mesh tape 230 is applied along the juxtapositions or other approximations between edges of the panel 110 and edges of the drywall 220. Here again, this step is usually delegated to a professional drywaller, but could be accomplished by the installer of the panel, regardless of which person actually does the work.

Figure 7D:
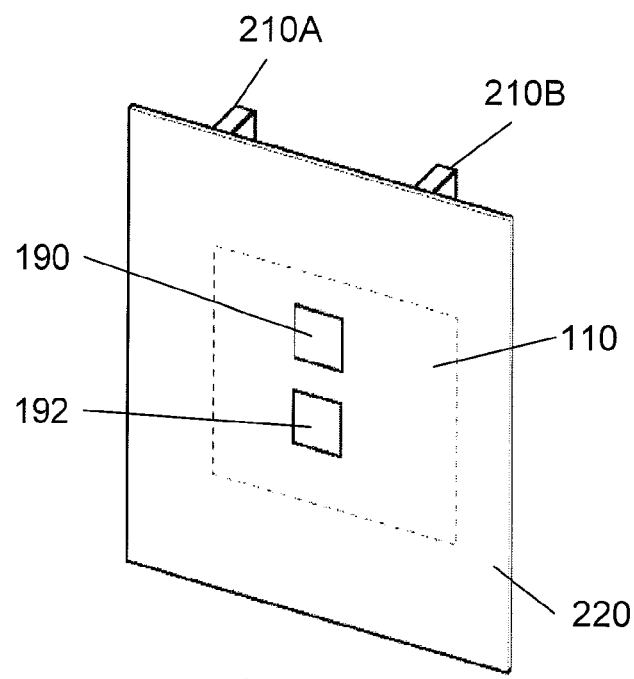
FIG. 7D is a front perspective view of the panel and drywall of FIG. 7C, where the mesh tape has been covered by spackle.
Figure 7E:
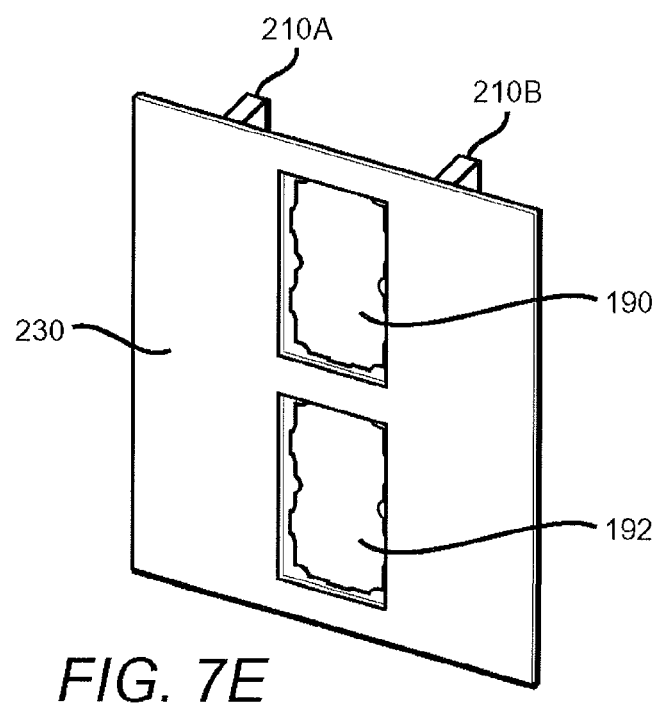
FIG. 7E is a front perspective view of the panel and drywall of FIG. 7C, where the spackle shields have been removed to show the openings.

In FIG. 7D the mesh tape is covered by a spackling compound, and is ready for painting, wallpapering, or other surface coating. Preferably, the spackling compound is smoothed over the entire front surface of the panel to the lips of openings 190 and 192. As used herein, the terms "spackle" and "spackling" should be interpreted as broadly as possible, to include for example plaster and plastering of any type. One objective is to provide a smoothed out surface that completely or substantially hides the joints between edges of the panel and edges of the drywall In FIG. 7E, the spackle shields are removed from openings 190, 192, and components can be installed in the new uniform wallboard 230.

Figure 8A:
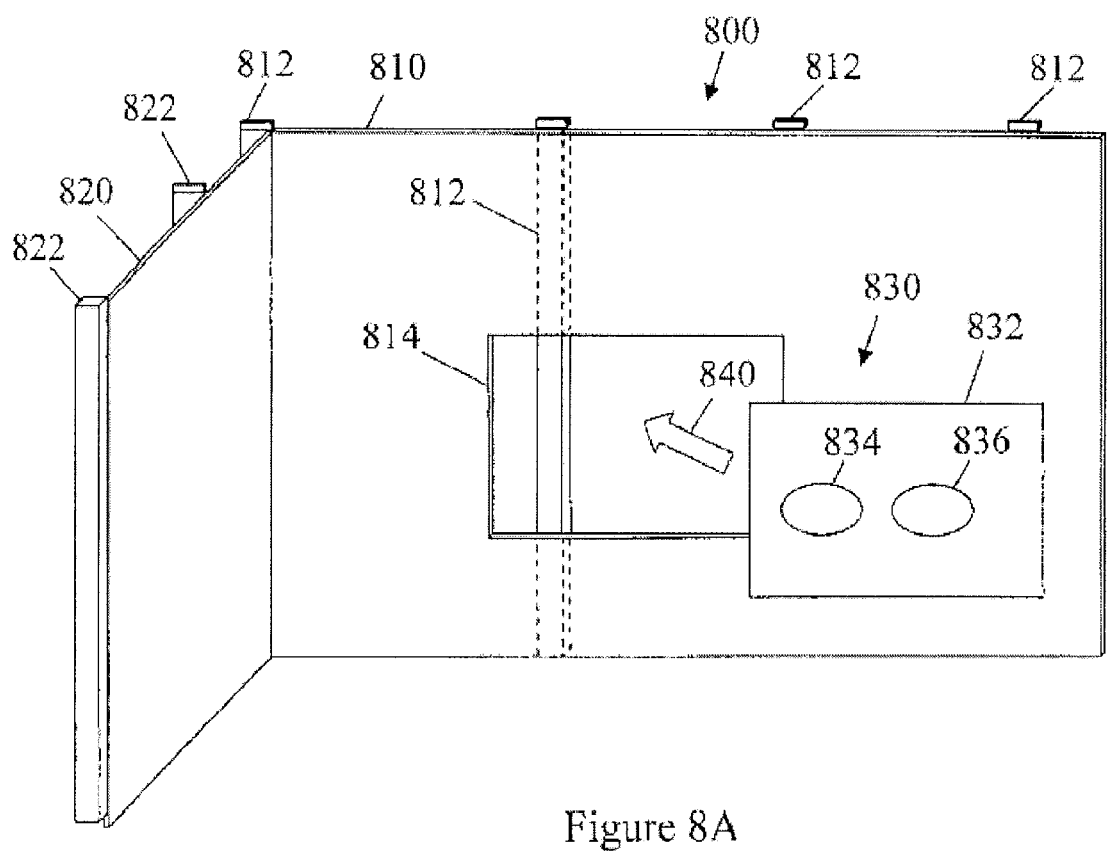
FIG. 8A is a perspective view of two structures in a building (e.g. walls or wall and ceiling), in which an opening has been cut to receive a panel assembly.

In FIG. 8A an installation 800 generally includes wallboards 810, 820, an opening 814 on structure 810, and a panel assembly 830 that will installed into the space 814, as shown by arrow 840.

Figure 11:
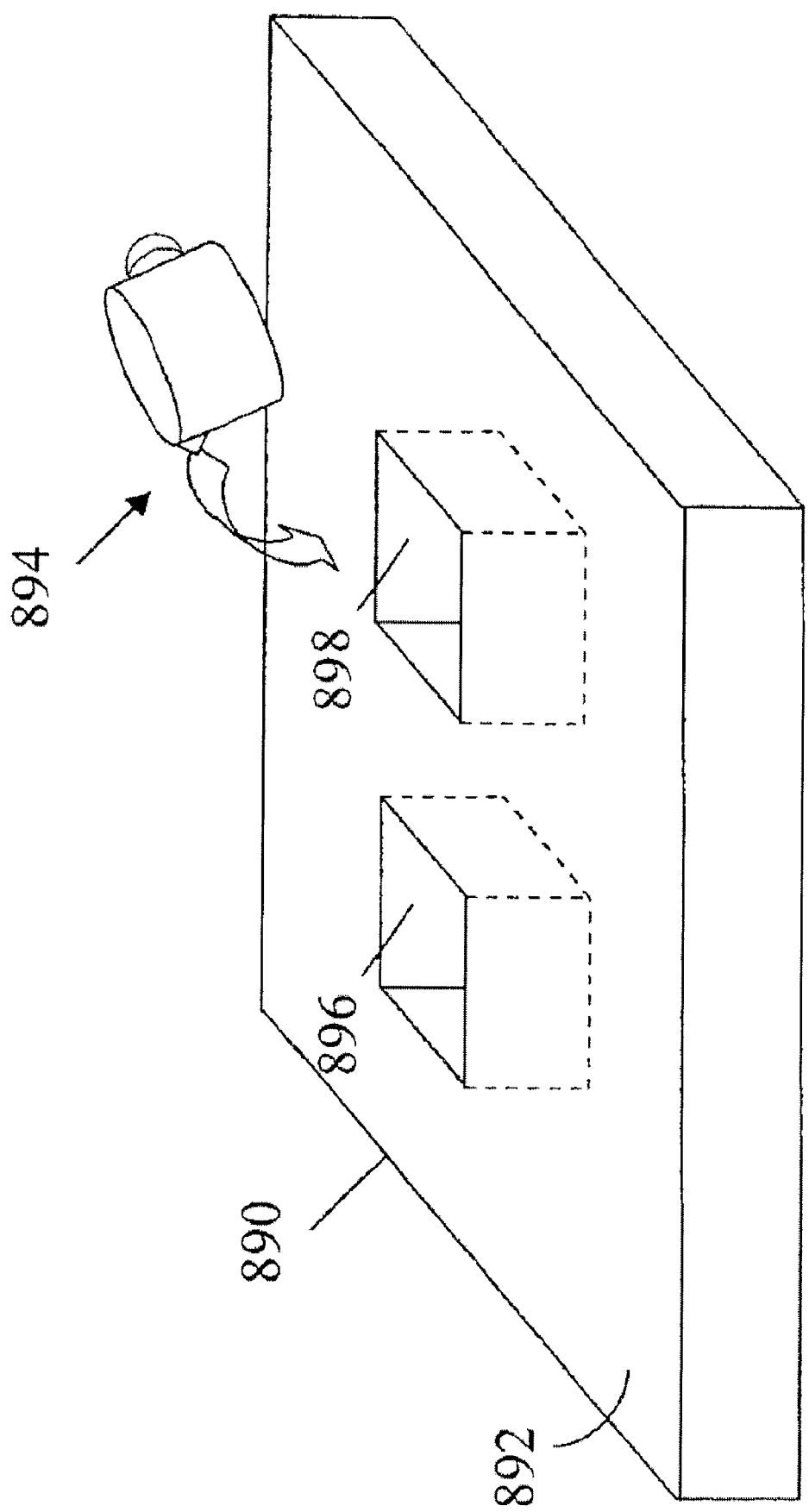
FIG. 11 is a perspective view of a panel assembly being formed by pouring a panel material into a mold.

As used herein, the term "assembly" means an object that has multiple components or functional portions. Thus, the term comprises: (a) multiple pieces that are coupled together in some manner, either temporarily or permanently; and also (b) a single molded object with multiple functional components. By way of example, panel assembly 892 in FIG. 11 is a panel assembly molded as a single piece.

In typical installations, the wallboards 810, 820 would be adjacent vertical walls, or a vertical wall and a ceiling, and FIG. 8A should be interpreted to include all such embodiments. Thus, for example, where wallboards 810, 820 are interpreted to be vertical walls, members 812, 822 could be studs. Where wallboard 810 is interpreted as a ceiling, members 812 could be joists, and members 822 could be horizontal struts. Although the portions of the wallboards 810. 820 depicted in the figure as substantially flat, those skilled in the art will appreciate that the structures could be curved, or have curved portions. In addition, those skilled in the art will appreciate that wallboard 810 could exist independently of wallboard 820.

Wallboards 810, 820 would typically comprise drywall, which term is used herein generically to include all manner of wallboard, fiberboard, gypsum board, GWB, plasterboard, Sheetrock® and Gyproc®, and so forth. Additionally or alternatively, wallboards 810, 820 could comprise other materials, including for example polymers, masonry, ceramics, and acoustic ceiling tile materials or other composites.

Wallboards 810, 820 can have any suitable dimensions, from only a few square feet or less, to hundreds of square feet or more. Wallboards 810, 820 will usually, however, have relatively small thicknesses of between ¼" and 1" in thickness.

Panel assembly 830 can be produced at a job site, for example, by cutting a hole out of a piece of drywall. The piece being used in such instances can be cut out from an existing vertical wall or ceiling, and or can be completely new to the job site. Either of those methods could work adequately for drywall, acoustic ceiling tile and other materials that are fairly easy to cut, but for difficult to cut materials, including for example polymers, masonry, and ceramics, the panel assembly can be most conveniently produced in a factory where the panel is dried or cured around a form (see FIG. 11) to define the opening.

As discussed above with respect to FIGS. 2-7, the openings 834, 835 of FIG. 8A can be any suitable size, shape, or number. As currently contemplated, it is desirable that the total front facing area consumed by the openings be relatively small with respect to that of the panel 832. That ratio is preferably at least 3, more preferably at least five. Viewed from another perspective, it is preferred that the panel 832 extend in at least one direction at least 3 inches (7.62 cm) from the closest edge of the openings 834, 835 for light or other simple switches, electrical outlets and so forth, and at least 5 inches (12.7 cm) for lights, more complicated switches and other controllers, speakers and so forth. Where the component has a front-facing surface area of at least 25 in$^2$ (about 160 cm$^2$), the panel 832 extends in at least one direction at least 12, 18, or even 24 inches (about 30, 45, or 60 cm) from the closest edge of either opening 834 or 835.

Figure 8B:
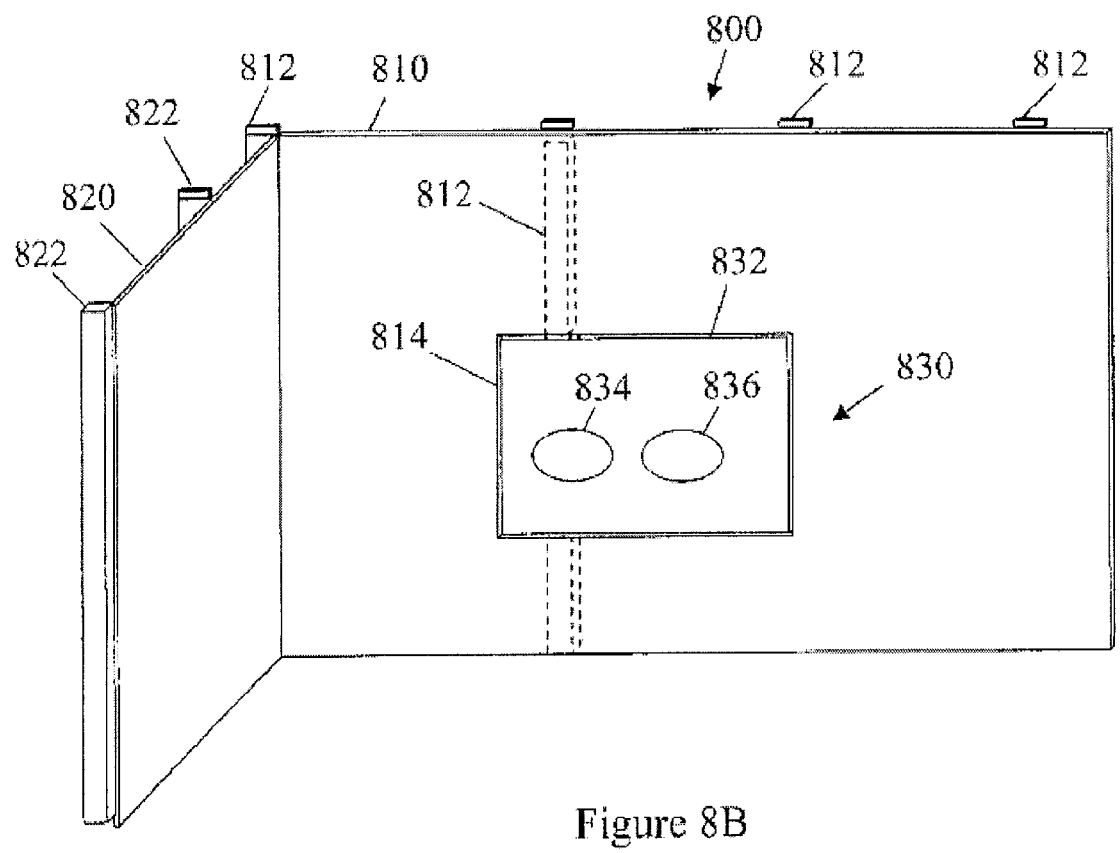
FIG. 8B is a perspective view of the two structures of FIG. 8A, in which the panel assembly has been placed within the opening.

In FIG. 8B the panel assembly 830 has been placed within the space 814. There will almost always be some gap between the edges of the panel assembly 830 and those of the surrounding structural component 810, ranging in typical installations from zero (where the panel assembly 830 is abutted against the structural component 810), and perhaps ⅛" (3.175 mm) to ¼" (6.35 mm). Indeed, there will almost always be multiple different gaps around the edge of the panel assembly. Where the workmanship is sloppy, or the project is especially difficult, the gap in some sections can be larger. In addition, it is contemplated that an intermediate member (not shown), as for example a paper, shim, or even a frame can be installed in the gap between the panel assembly 830 and the structural component 810. As long as the edges of the assembly and the wallboard are somewhat near each other, and the gap can be finished and concealed such that an at least superficially continuous junction is established between them, the edges are considered to be approximated.

Figure 8C:
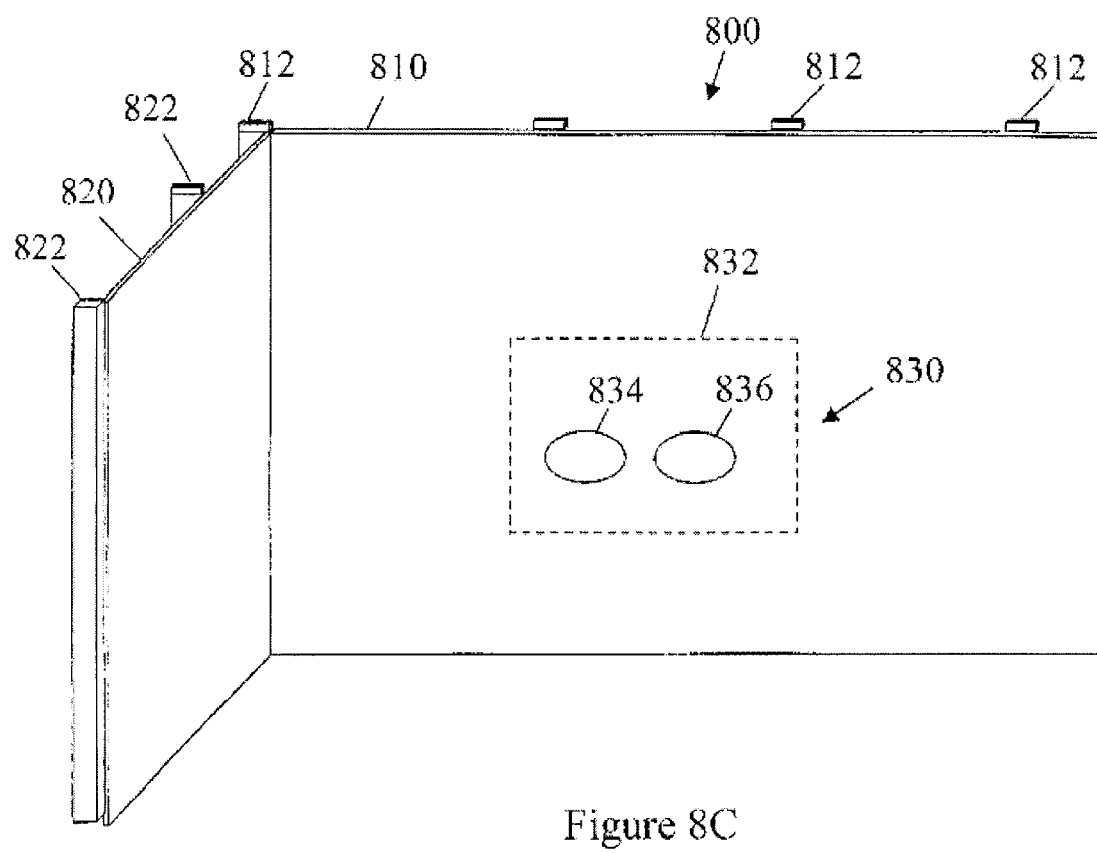
FIG. 8C is a perspective view of the two structures of FIG. 8B, in which the approximated edges of the panel assembly and the wall have been finished to provide a superficially continuous junction.

In FIG. 8C the approximated edges of the panel assembly and the wallboard have been finished to provide an at least superficially continuous junction. As used herein the term "at least superficially continuous junction" refers to a junction that appears to casual observation to be seamless. By way of example, a good workman-like job in taping and plastering adjacent sections of wall board is considered herein to produce an at least superficially continuous junction, especially where subsequent painting or wallpapering eliminates any seam apparent to casual observation.

Figure 9:
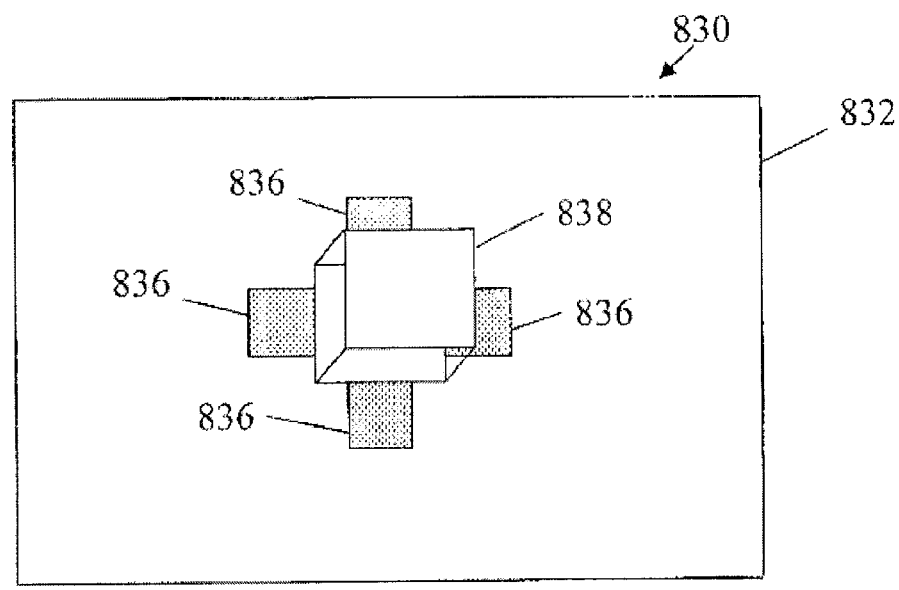
FIG. 9 is a rear view of the panel assembly of FIGS. 8A-8C, showing a receiver and attachments.

In FIG. 9 a rear view of the panel assembly 830 of FIGS. 8A-8C shows a receiver 838 and attachments 836 of the receiver to the panel 832. The receiver 838 in this instance is an open box, but all manner of alternative receivers are also contemplated. For example, receivers could be tubular or have some other shape, could be completely or partially closed, could be larger, smaller, or the same size as the opening, and can have punch outs such as those found on a typical electrical connection box. An exemplary receiver made to accept an electrically powered component could have electrical connections that mate with electrical connections on the component as the component is pushed into the receiver. Preferably, the electrical connections both power the component, and connect the component to other electrical devices.

The attachments 836 are shown as four wings, extending from the four sides of the receiver 838, and then glued, nailed, stapled or otherwise affixed to the panel 832. Those skilled in the art will appreciate that still other methods could be used, including forming the panel 832 around the wings or attaching the receiver to a bracket on panel 832. Still further, it is contemplated that wings could be eliminated altogether. In a ¾" or 1" thick fiberboard, for example, a collar pressed into the opening, or used as a form around which the fiberboard is made, might have sufficient strength to hold a relatively lightweight component.

Figure 10A:
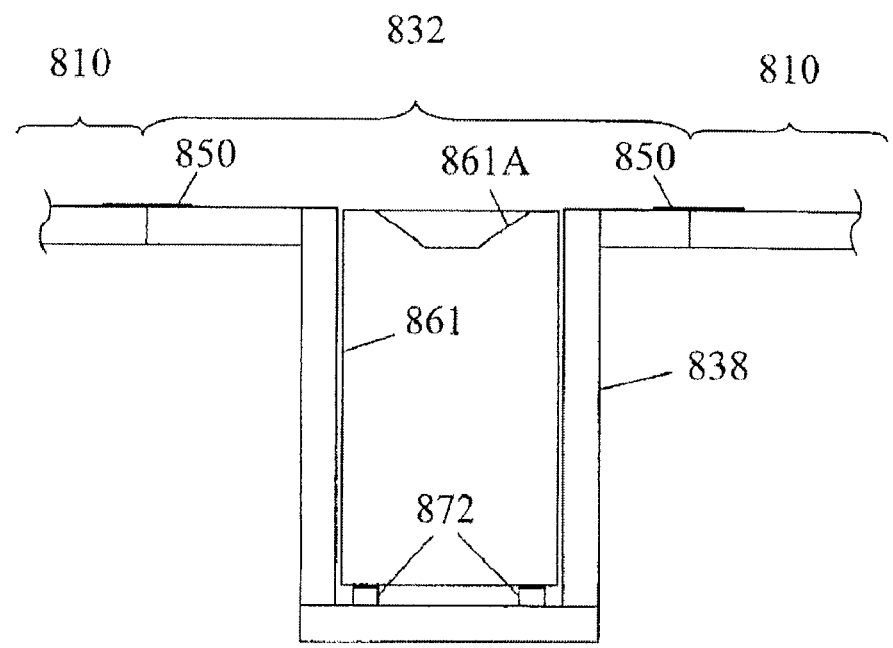
FIG. 10A is a horizontal cross-section of a panel assembly and speaker component installed in a wall, where the component is seated to the assembly using magnets.
Figure 10B:
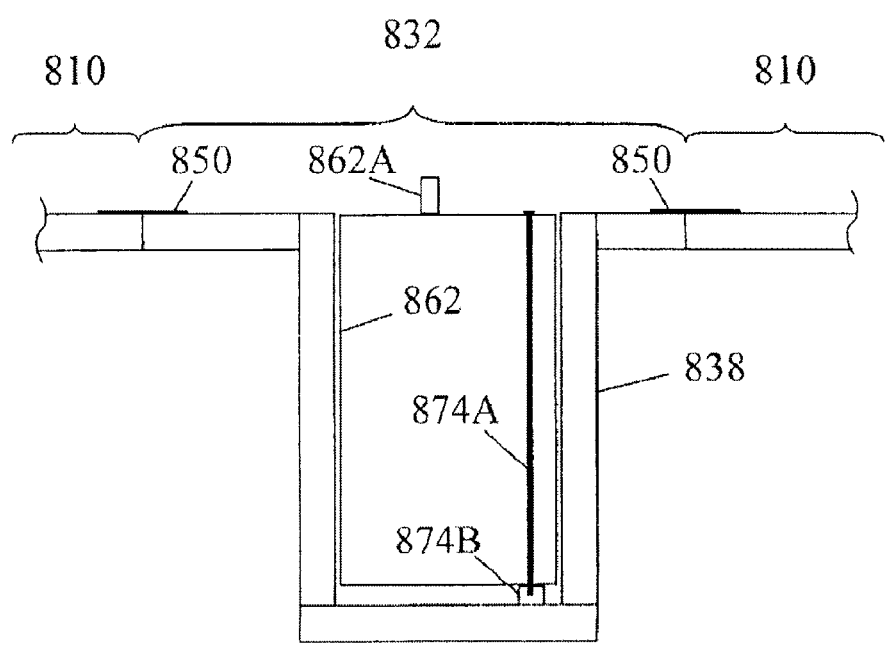
FIG. 10B is a horizontal cross-section of a panel assembly and switch component installed in a wall, where the component is seated to the assembly using a long bolt.
Figure 10C:
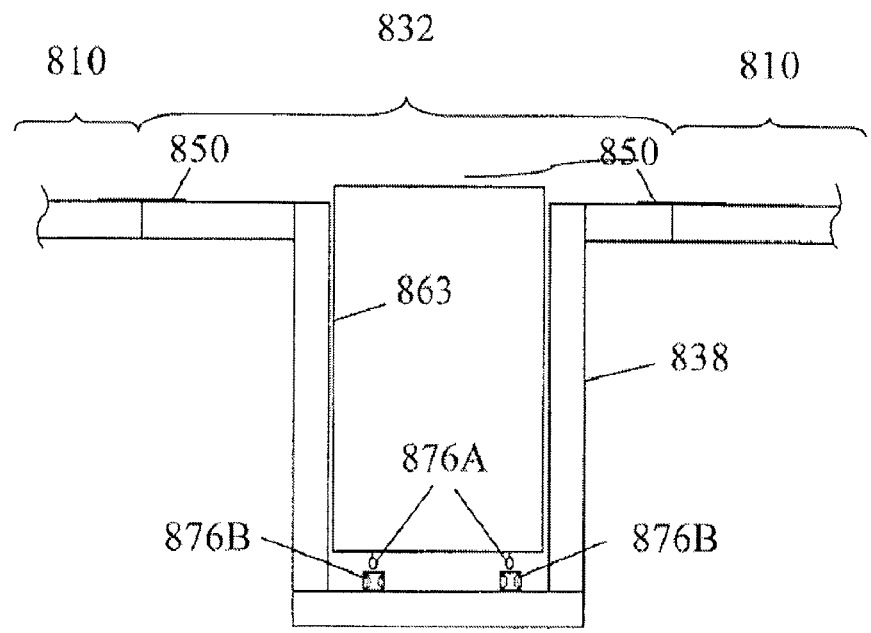
FIG. 10C is a horizontal cross-section of a panel assembly and light component installed in a wall, where the component is seated to the assembly using a detent.
Figure 10D:
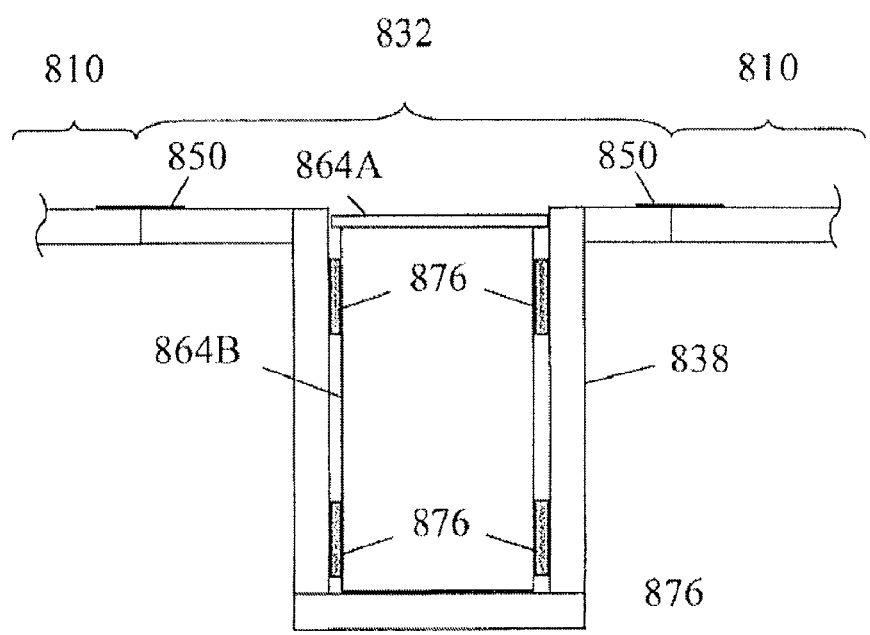
FIG. 10D is a horizontal cross-section of a panel assembly and a generic component installed in a wall, where the component is seated to the assembly using friction surfaces.

FIGS. 10A-10D depict alternative mechanisms for coupling and/or locking various components 861-864 within receivers 838. In FIG. 10A the mechanism comprises magnets 872 that lock to a magnetic portion of component 861. The component can then be removed from the receiver by attaching a stronger magnet to component 861, and pulling component 861 away from magnets 872. In FIG. 10B, the mechanism comprises a long threaded bolt 874A that is turned into a nut 874B. In FIG. 10C the mechanism comprises detents that fit within biasing members 876B. In FIG. 10D the mechanism comprises a compressible polymer or fabric that fits in the gap between the rear portion 864B of the component 864, and the receiver 838. In this particular example, the facing plate 864A of the component 864 is larger across than the rear portion 864B.

In the Figures component 861 is a speaker or other speaker assembly 861A, component 862 is a light or other switch, (showing toggle 862A), component 863 is a light, light fixture or other light assembly, and component 864 is a generic component that could euphemistically be viewed as an electrical outlet, or any other reasonably installable component. Of course, the combinations expressly depicted in the Figures are merely examples, and thus it should be appreciated that one could combine any of the components 861-864 with any of the depicted seating mechanisms, or indeed any suitable seating mechanism.

FIGS. 10A-10D also demonstrate that the face of the components are only optionally made completely flush with the face of the panel 832 when they seat with the receiver 838. FIG. 10D, for example, shows a face portion 864A that is recessed from the face of the panel 832. Here, those skilled in the art will appreciate that the recess is exaggerated to assist visualization. In practice, any such recess or extension would likely be less than ⅛ inch (3.175 mm). Furthermore, it is contemplated that the components can be easily removed by extraction tools, such as a screwdriver and the like, to provide for simpler change of installation.

FIG. 11 is a perspective view of a panel assembly 892 being formed by pouring a panel material from container 832 into a mold 894. This process brings the poured material right up against the frame portion that defines the openings 896 and 898, regardless of any irregularity or other difficulties with the shape of the opening. All manner of panel materials are contemplated, including for example curable plastics, and masonry composites.

Figure 12A:
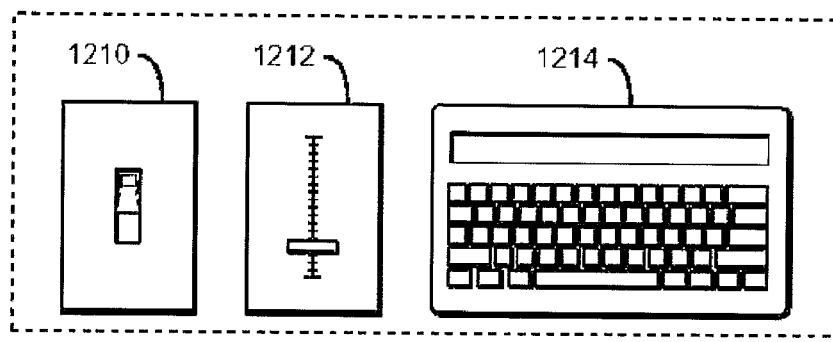
FIG. 12A is a front plan view of a wall with installed components using the panel of FIG. 2.
Figure 12B:
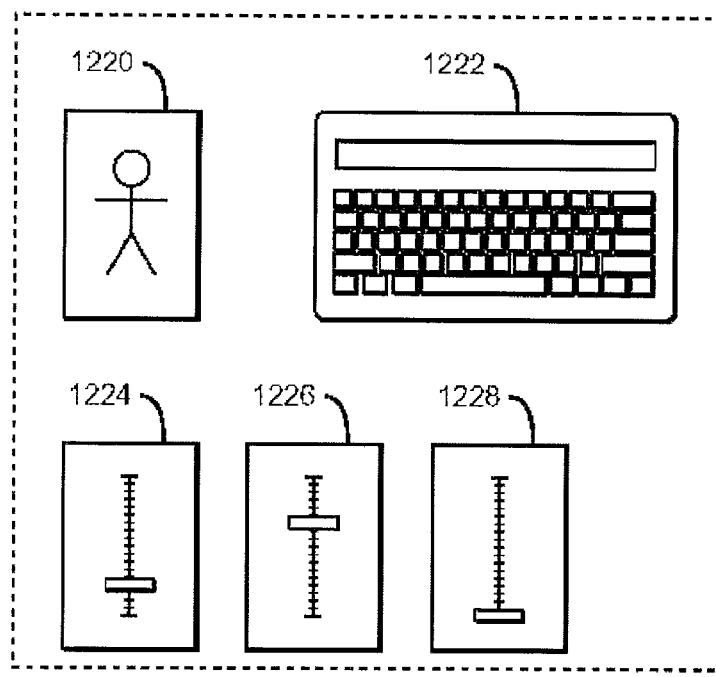
FIG. 12B is a front plan view of a wall with installed components staggered in an alternative configuration.
Figure 12C:
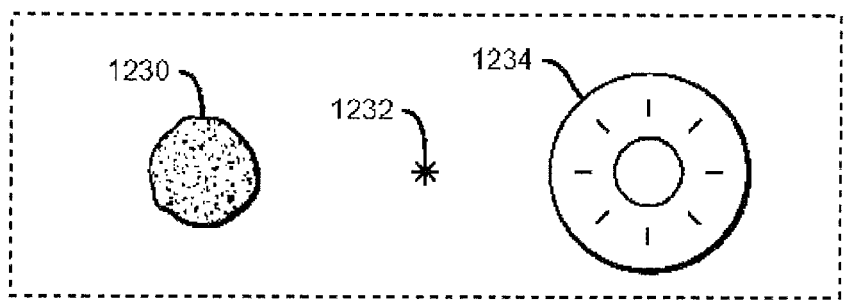
FIG. 12C is a front plan view of a ceiling with installed components.

FIGS. 12A-12C are front plan views of walls and ceilings with components installed in the brackets. FIG. 12A shows components installed in the panel of FIG. 2, with a light switch 1210, a volume control 1212, and a security system 1214, all aligned horizontally in a row. FIG. 12B shows an installation where the components are aligned in a staggered pattern that could be used, for example, long a staircase, with a portrait 1220, a security system 1222, and volume controls 1224, 1226, and 1228. FIG. 12B shows a ceiling installation with a speaker 1230, a sprinkler spigot 1232, and a recessed light 1234. As shown, the present invention can be used to mount multiple flush-mounted components in various configurations with greater accuracy than prior art could provide.

Thus, specific embodiments and applications of mounting multiple components in a wallboard have been disclosed. It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of mounting a plurality of components in a wallboard, comprising:
providing a panel with a first opening that extends from a front side of the panel to a back side of the panel and a second opening that extends from the front side of the panel to the back side of the panel;
coupling a first receiver to the first opening by compressing a first front lip and a first rear lip of the first receiver about opposing sides of the panel, wherein the first front lip has a sloped spackle rim;
coupling a second receiver to the second opening by compressing a second front lip and a second rear lip of the second receiver about opposing sides of the panel, wherein the second front lip has a sloped spackle rim;
approximating an edge of the assembly with an edge of the wallboard to form a junction between the edges;
concealing the junction by at least one of taping and plastering over the junction;
coupling a first one of the plurality of components to the first receiver; and
coupling a second one of the plurality of components to the second receiver.

2. The method of claim 1, wherein an edge of the first receiver is aligned with an edge of the second receiver.

3. The method of claim 1, wherein a center of an edge of the first opening is co-linear with a center of an edge of the second opening.

4. The method of claim 1, wherein the edge of the assembly is an edge of the panel.

5. The method of claim 1, wherein coupling the first component to the first receiver comprises locking the first component to the first receiver.

6. The method of claim 5, further comprising using a magnetic tool to remove the first component from the first receiver, and removing the first component from the first receiver.

7. The method of claim 1, wherein the panel comprises at least one of a polymer, plaster, wood, and fiberboard.

8. The method of claim 1, wherein the panel comprises a material molded about the first receiver and the second receiver.

9. The method of claim 1, further comprising smoothing a spackling compound over a surface of the panel to a lip of the first receiver and to a lip of the second receiver.

10. The method of claim 1, further comprising removing a spackle shield from the first receiver.

11. The method of claim 1, further comprising installing a shim into the junction.

12. The method of claim 1, further comprising attaching the assembly to a support structure of a building.

13. The method of claim 12, wherein the support structure is one of a wall beam and a ceiling joist.

* * * * *